United States Patent
Räsänen et al.

(10) Patent No.: US 7,551,734 B2
(45) Date of Patent: Jun. 23, 2009

(54) METHOD AND SYSTEM FOR MODIFYING A CONNECTION PARAMETER

(75) Inventors: Juha Räsänen, Espoo (FI); Timo Kauhanen, Kirkkonummi (FI); Mark Lybeck, Helsinki (FI)

(73) Assignee: Nokia Corporation, Espoo (FI)

( * ) Notice: Subject to any disclaimer, the term of this patent is extended or adjusted under 35 U.S.C. 154(b) by 1101 days.

(21) Appl. No.: 10/450,611

(22) PCT Filed: Dec. 22, 2000

(86) PCT No.: PCT/EP00/13251

§ 371 (c)(1),
(2), (4) Date: Jun. 17, 2003

(87) PCT Pub. No.: WO02/052811

PCT Pub. Date: Jul. 4, 2002

(65) Prior Publication Data

US 2004/0028037 A1    Feb. 12, 2004

(51) Int. Cl.
*H04M 7/00* (2006.01)

(52) U.S. Cl. .............................. 379/221.14; 379/221.1; 379/221.08; 379/221.09; 379/21.12; 370/373; 370/377; 370/384; 370/385; 370/522; 370/524; 370/352; 370/353; 370/354; 370/355; 370/356

(58) Field of Classification Search ......... 370/352–356, 370/373, 377, 384, 385, 522, 524; 379/221.14, 379/221.1, 221.08, 221.09, 221.12
See application file for complete search history.

(56) References Cited

U.S. PATENT DOCUMENTS 4,713,806 A * 12/1987 Oberlander et al. ......... 370/358
5,384,771 A *  1/1995 Isidoro et al. ............... 370/254

FOREIGN PATENT DOCUMENTS

EP        0 746 127 A2    12/1996

OTHER PUBLICATIONS

Handley et al, "RFC 2543 SIP: Session Initiation Protocol", IETF Network Working Group, Mar. 1999, XP002173547, p. 123, line 18-p. 125, line 19.

(Continued)

*Primary Examiner*—Quynh H. Nguyen
(74) *Attorney, Agent, or Firm*—Squire, Sanders & Dempsey L.L.P.

(57) ABSTRACT

The present invention relates to a method and system for modifying at least one connection parameter of a circuit switched terminal device, wherein the at least one connection parameter can be modified at a called terminal by a corresponding input operation after the receipt of a setup signaling message. The connection parameter is incorporated in an answer signaling message to be transmitted in response to the setup message, and compared with a negotiated connection parameter. Based on the comparison result, a parameter modification is initiated. Thereby, a discreet and fast slip from an offered to a wanted service can be offered at little message traffic.

34 Claims, 4 Drawing Sheets

OTHER PUBLICATIONS

J. Van Geel, "Bearer independent call control opens up new technologcal solutions", J. Inst. Br. Telecommun. Eng. (UK), Journal of the Institution of British Telecommunications Engineers, vol. 1, No. 3, Jul. 2000, pp. 21-24, XP000997041.

Toga et al, "ITU-T Standardization Activities for Interactive Multimedia Communications on Packet-Based Networks: H.323 and Related Recommendations", Computer Newtworks and ISDN Systems, North Holland Publishing, vol. 31, No. 3, Feb. 11, 1999, pp. 205-223, XP000700319.

Anquetil et al, "Media Gateway Control Protocol and Voice over IP Gateways. MGCP and VOIP Gateways Will Offer Seamless Interworking of New VOIP Networks with Today's Telephone Networks", Electrical Communication, Alcatel.

Schulzrinne et al, "Signaling for Internet telephony", Proceedings of the International Conference on Network Protocols, Oct. 13, 1998, pp. 298-307, XP002139514.

* cited by examiner

METHOD AND SYSTEM FOR MODIFYING A CONNECTION PARAMETER

FIELD OF THE INVENTION

The present invention relates to a method and system for modifying at least one connection parameter for a connection in which at least one terminal device, such as a H.324 multimedia terminal, is arranged in a circuit switched network, the connection parameter defining a type of information stream supported by said terminal.

BACKGROUND OF THE INVENTION

The personal computer and other digital devices are rapidly becoming key communication tools for millions of users worldwide. The importance of digital and data network communications has greatly increased with the explosion of the Internet. While electronic mail is still a dominant method of interactive computer communications, electronic conferencing and IP-based telephony are becoming increasingly attractive. The adoption of packet switching and its merging with circuit switching helps drive this communications migration. There are many reasons for this, among them pricing advantages due to improved source utilization, seamless transmissions between monomedia and multimedia communications, as well as between human-to-computer (e.g. web-based) and interpersonal interactions.

For interactive multimedia communications on packet-based networks including IP-based telephony, the relevant standard of the Telecommunication Sector of International Organization for Standardization (ITU-T) is the H.323 series of recommendations comprising besides H.323 itself H.225.0 (core message definitions), H.245 (media channel control), H.235 (security framework), H.450.x (supplementary services) and H.332 (extensions for large group conferences).

Multimedia in the circuit switched (CS) domain is realized by the H.324 (incl. H.324/I) recommendation for PSTN- and ISDN-based video conferencing or devices. The H.324 terminal sets up a transparent CS data call, and the user plane connection which is called bearer in the context of third generation (3G) mobile communications, is partitioned by the H.324 terminal application into various media components. The composition of the media components is the result of an in-band negotiation, comprising those components which were offered by the calling user or terminal and supported or accepted by the called user or terminal. An in-band signaling is a signaling where the control signals are sent within a specific logical channel of the user plane connection or bearer. The partitioning of the bearer into logical channels is then performed by a H.223 multiplex protocol, and the control (i.e. setting up, releasing the logical channels etc.) is handled by a H.245 control protocol. The setup of the H.324 multimedia session is divided into two phases. Initially, an outband phase is handled by the "basic telephony" call control (CC) by which the circuit-switched call is set up and a bearer is provided. Then, an inband phase follows, where the peer H.324-terminals negotiate and set up the various media components over the established user plane connection or bearer.

According to current scenarios, service and/or bearer parameters can be negotiated with setup and setup response messages in a CS call. In multimedia systems, such as IP based multimedia (IM) systems, a service modification feature is provided as a swapping procedure from one service (e.g. video or multimedia) to another (e.g. speech) with related bearer modifications. In general, a user answers incoming calls with a preconfigured service and parameter setting. 11 the user wants to change the service or parameter settings, e.g. from video to speech, inspired e.g. by the identity of the displayed calling person, he must invoke an in-call modification during the call by using the above service modification feature. However, such an in-call modification during the call leads to an indiscrete swapping operation recognized by the calling person. Furthermore, the service modification requires a considerable amount of time delay and message traffic in the network.

SUMMARY OF THE INVENTION

It is therefore an object of the present invention to provide a method and system for modifying a connection parameter, by means of which a discrete and fast modification can be assured.

This object is achieved by a method for modifying at least one connection parameter for a connection in which at least one terminal device is arranged in a circuit switched network, the at least one connection parameter defining at least one type of information stream supported by the called terminal, the method comprising the steps of:

providing an input function for enabling a change of the at least one connection parameter after a setup message has been received from a calling terminal;

incorporating the at least one connection parameter into an answer message transmitted to said calling terminal in response to said setup message;

comparing the at least one modified connection parameter with at least one negotiated connection parameter; and initiating a modification of the at least one connection parameter based on the comparison result of the comparing means.

Furthermore, the above object is achieved by a circuit switched terminal device having a service modification function for modifying a connection parameter, the connection parameter defining a type of information stream supported by the terminal device, the terminal device comprising:

input means for enabling a change of the connection parameter after a setup message has been received from a calling terminal;

setting means for incorporating the connection parameter into an answer message; and transmitting means for transmitting the answer message to the calling terminal in response to the setup message.

Additionally, the above object is achieved by a circuit switched terminal device comprising:

transmitting means for transmitting a setup message to a called terminal; receiving means for receiving an answer message from the called terminal;

detecting means for detecting a connection parameter incorporated in the answer message transmitted to the terminal;

comparing means for comparing the detected connection parameter with a negotiated connection parameter which has been negotiated in a setup negotiation; and call control means for initiating said modification of said connection parameter based on the comparison result of the comparing means.

In addition thereto, the above object is achieved by a network element for establishing a connection to a terminal device, the network element comprising:

detecting means for detecting a connection parameter incorporated in an answer message transmitted to the terminal device;

comparing means for comparing the detected connection parameter with a negotiated connection parameter which has been negotiated in a setup negotiation; and signaling means for initiating said modification based on the comparison result of the comparing means.

Accordingly, the user may decide on the service and/or parameters to be used in the call at the moment of answering rather than using the service or parameters defined by a preconfiguration or default setting. Thereby, a possibility is given to the user to answer the call with the service he wants to use in a particular case, eliminating the need for an extra in-call modification phase and an extra delay.

The user or subscriber may use the information available at the time of alerting (e.g. the calling party's identification or identity) to decide which service and/or parameter settings to use when answering the call. Thereby, a tactful and discreet slip from an offered service to a wanted service is achieved without first setting up e.g. an end-to-end video connection and then indiscreetly swapping to e.g. a speech connection. As an additional advantage, less message traffic is generated in the network when the service is changed, and a faster change to the wanted service is achieved.

The called terminal may be a multimedia terminal, e.g. a H.324 compliant terminal or a corresponding packet switched multimedia terminal. Furthermore, the initiation of the modification may be an invocation of an in-call modification. The connection parameter may define a multimedia bearer service, such as a video service, a multimedia service, a speech service, or any other bearer or tele service. The in-call modification may be invoked by a terminal or a network element. The mobile network CC signaling and e.g. BICC signaling are used to initiate a service modification to the desired or wanted service (as defined by the modified connection parameter) in the mobile network leg and in the fixed network leg, respectively.

Preferably, the answer message may be an ISUP (ISDN User Part) Answer Message (ANM) or a Q.931 Connect message. In this case, the connection parameter may comprise a Bearer Capability (BC), Low Layer Compatibility (LLC) and/or High Layer Compatibility (HLC) information element. The LLC information element may be an LLC information element according to the Mobile Radio Interface Layer 3 call control protocol used for carrying a user capability information over the Iu and radio interfaces to a mobile station or mobile terminal. The Mobile Radio Interface Layer 3 call control protocol is described in the specifications 3GPP TS 24.008 (UMTS release 99). Similarly, any other capability information element similar to the LLC may be used in the Q.931 and 24.008 protocols.

Furthermore, the answer message may be a Session Initiation Protocol (SIP) 200 OK message, wherein the connection parameter is a Service Description Protocol (SDP) parameter of the SIP 200 OK message.

The setup message may be an ISUP Initial Address Message (IAM) or a SIP INVITE message.

The comparing and invoking steps may be performed in the calling terminal or in a network element through which the answer message is routed. This network element may comprise a media gateway control function, or may be any switching or routing element through which the answer message is routed.

The call control means may be compliant with the ITU-T BICC signaling recommendation.

BRIEF DESCRIPTION OF THE DRAWINGS

In the following, the present invention will be described in greater detail based on a preferred embodiment with reference to the accompanying drawing figures, in which.

DESCRIPTION OF THE PREFERRED EMBODIMENT

Figure 1:
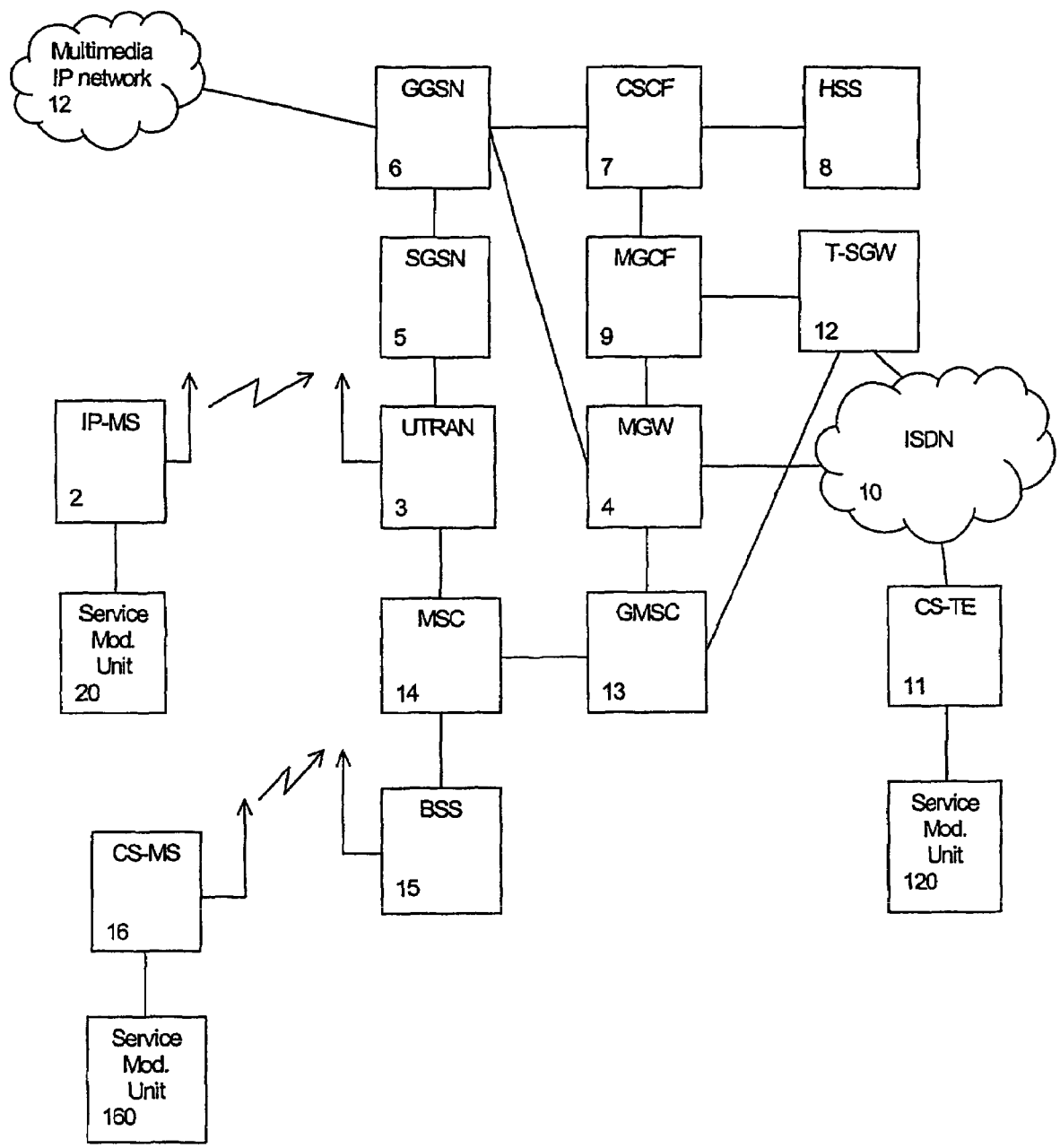
FIG. 1 shows a network system according to the 3GPP ALL IP reference model, wherein a PS multimedia terminal can be connected to a fixed or a mobile CS multimedia terminal.

The preferred embodiment of the present invention will now be described on the basis of an establishment of a connection for a multimedia call in a network environment according to a 3GPP ALL IP reference model, as depicted in FIG. 1.

According to FIG. 1, an IP (Internet Protocol) mobile terminal or station 2 which provides a radio-connection to a UMTS Terrestrial Radio Access Network (UTRAN) 3, a circuit-switched mobile station 16 which provides a radio-connection to a GSM (Global System for Mobile communications) core network or the UMTS network, and a circuit-switched terminal equipment 11 which is connected to a fixed network such as a PSTN (Public Switched Telephone Network) or ISDN (Integrated Services Digital Network) 10 each comprise a service modification unit 20, 160 and 120, by means of which an input function is provided to the user or subscriber so as to change or modify a connection parameter at any time even after the receipt of a call setup signaling message from a calling terminal of the network.

The UTRAN 3 comprises at least one Radio Network Controller (RNC, not shown) for providing a switching function to e.g. a GPRS (General Packet Radio Services) network comprising a Serving GPRS Support Node (SGSN) 5 having a switching and mobility management function in the GPRS core network of the UMTS network. Furthermore, the SGSN 5 is connected to a Gateway GPRS Support Node (GGSN) 6 which provides an access function to a multimedia IP-based network 12, such as the Internet.

Additionally, the RNC of the UTRAN 3 may establish a connection to the CS terminal equipment 11 via the ISDN 10 and a Media Gateway (MGW) 4 may be arranged for adapting the PS multimedia connection of the UMTS network (incl. the SGSN 5 and the GGSN 6) to the CS connection of the ISDN 10. In particular, the MGW 4 may allow a PS H.323 or a SIP system to interoperate with ISDN terminals such as the CS terminal equipment 11 which may be a H.324 (H.324/I) compliant terminal. The gateway functionality of the MGW 4 is addressed e.g. in the ITU-T recommendation H.246 for the case of an interworking of H-series multimedia terminals with H-series multimedia terminals and voice/voice-band terminals.

The MGW 4 is connected to a Media Gateway Control Function (MGCF) 9 which can be connected via a T-SGW (Transmission Signaling Gateway) 12 to the ISDN 10 or a Gateway Mobile Switching Center (GMSC) 13 of the GSM core network.

Furthermore, the MGCF 9 may be connected via a Call State Control Function (CSCF) 7 to a Home Subscriber Server (HSS) 8 comprising a subscriber database in which subscriber data required for mobility management and roaming is stored.

A more detailed description of the functions of the MGW 4, the MGCF 9, the CSCF 7 and related 3GPP ALL IP network elements may be gathered from the corresponding 3GPP Release 4 specifications.

The circuit-switched mobile station 16 may be connected via a Base Station Subsystem (BSS) 15 and at least one Mobile Switching Center (MSC) 14 to the GMSC 13. Then, the GMSC 13 provides access either to the MGW 4 so as to provide a user plane connection, or via the T-SGW 12 to the MGSF 9 so as to provide a control channel for outband control signaling messages.

When a multimedia connection is to be established between e.g. the IP mobile station 2 and the CS terminal equipment 11, an initial outband control signaling is transferred via a control channel routed through the UTRAN 3, the SGSN 5, the GGSN 6, the CSCF 7, the MGCF 9, the T-SGW 12 and the ISDN 10 as a control plane for the setup control signaling. During the initial setup negotiation of the multimedia call, wherein connection parameters of the multimedia connections are negotiated, a user plane connection or bearer is established between the IP mobile station 2 and the CS terminal equipment 11 via the UTRAN 3, the MGW 4, the SGSN 5, the GGSN 6 and the ISDN 10, wherein the MGW 4 provides the adaptation or interworking function for adapting the PS connection of the UMTS network to the CS connection of the ISDN 10.

A similar procedure is performed in the event that the IP mobile station 2 is connected to CS mobile station 16. In this case, the control channel for the initial setup negotiation is routed through the UTRAN 3, the SGSN 5, the GGSN 6, the CSCF 7, the MGCF 9, the T-SGW 12, the GMSC 13, the MSC 14 and the BSS 15. The user plane connection or bearer is then established between the IP mobile station 2 and the CS mobile station 16 via the UTRAN 3, the SGSN 5, the GGSN 6, the MGW 4, the GMSC 13, the MSC 14 and the BSS 15.

The initial call control or call setup negotiation via the control channel or plane comprises a setup message in which the calling user proposes certain connection parameters. In an acknowledgement to the setup request, the called terminal accepts at least a part of the requested connection parameters or characteristics. This part is based on terminal characteristics of the called terminal or a default setting or presetting based on user preferences. This negotiation principle may as well be used for negotiating the composition of a multimedia session, i.e. the media components required for the multimedia connection.

The service modification units 20, 160 and 120 may be arranged in the housing of the respective mobile station or terminal equipment and provide an input function for enabling the user or subscriber of the respective terminal device to input a modified connection parameter after the receipt of a setup message from a calling terminal. Thus, the user can decide on the service and/or parameters to be used in the call at the moment of answering, and is not bound to using a service parameter defined by the preconfiguration or default setting. The parameters may relate to any type of media component or any type of codec or protocol to be used for the connection, e.g. MPEG video, G.723.1 audio, or the like. The service modification units 20, 160 and 120 may provide a display or indication function by which a number or identity of the calling terminal is displayed together with a question as to whether the user wishes to change the default parameter settings e.g. from video to speech. The question can of course be presented in various ways such that the user is provided with graphical symbols representing the choices concerning the media types for answering the call. It can be conceived, for instance, that the presence of video could be indicated as an eye symbol.

Similarly, pure audio could be indicated as an ear symbol. The user can then choose the media types for the call just by pressing a key or selecting an icon on the screen. Of course, more laborious user interface options can be conceived such as selecting features or functions from a menu.

The modified connection parameter input by the user is then incorporated or added to an answer message or subsequent acknowledgement to the initial setup message received from the calling terminal. This answer message is transmitted via the control channel to the calling terminal. At an intermediate network element, such as an MGCF 9, the GMSC 13, the MSC 14, the SGSN 5 or another switching or routing network element, or at the calling terminal, the modified connection parameter is compared to the initially negotiated network parameter, and an in-call modification procedure is invoked to establish a tele service or bearer according to the modified connection parameter, if a parameter change has been determined.

Figure 2:
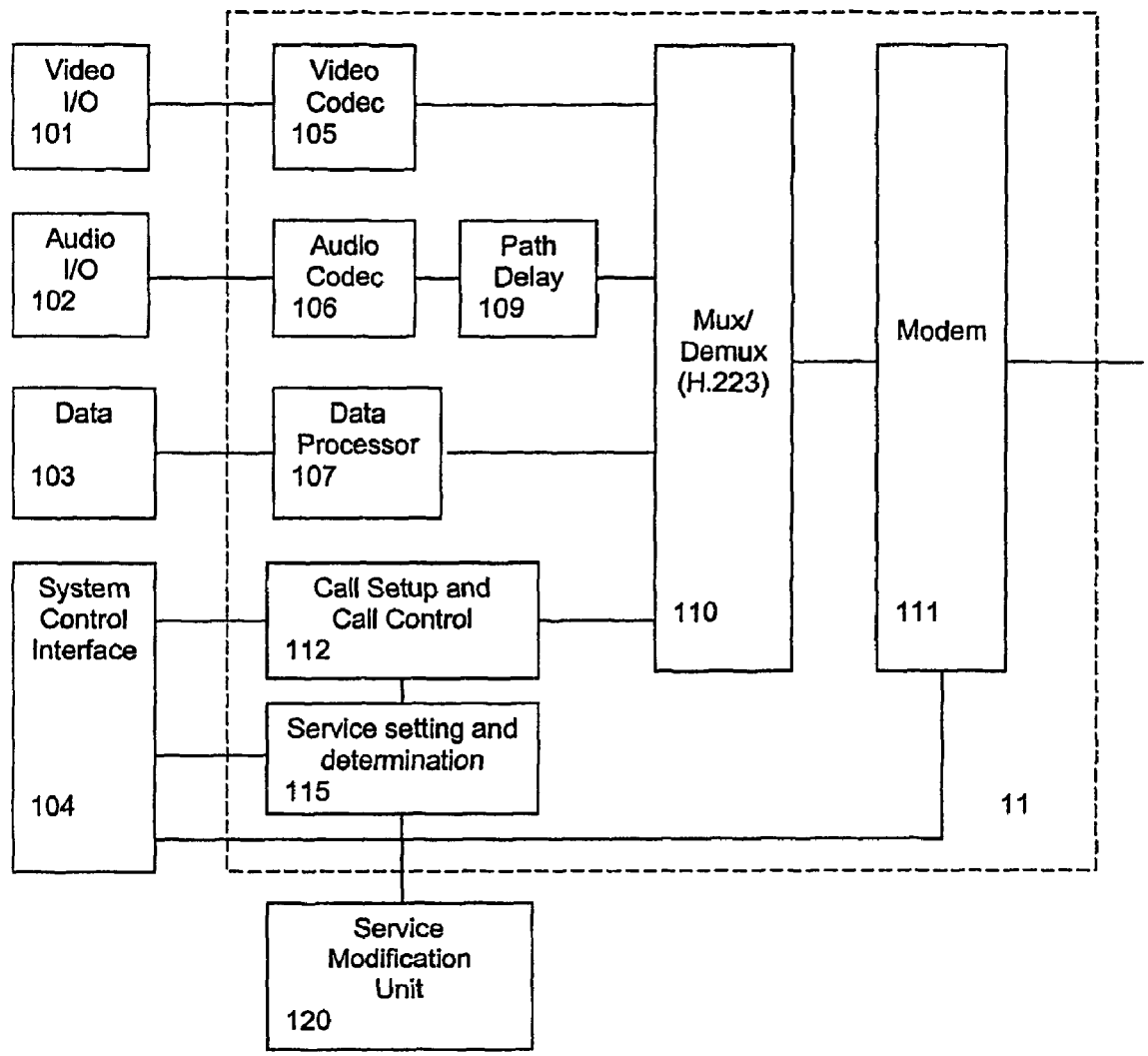
FIG. 2 shows a schematic block diagram of a CS multimedia terminal for a 3.1 kHz PSTN case according to the preferred embodiment of the present invention.

FIG. 2 shows a schematic block diagram of a CS terminal equipment 11 which is a H.324 compliant 3.1 kHz/modem based terminal in the preferred embodiment. A corresponding ISDN terminal does not have a modem. A similar terminal functionality may be provided at the CS mobile station 16. According to FIG. 2, a video input/output equipment 101, an audio input/output equipment 102, a data application equipment 103, and a system control interface 104 are connected to CS terminal equipment 11. In particular, the video input/output equipment 101 may include cameras and monitors, their control and selection, video processing to improve compression or provide split-screen functions. The audio input/output equipment 102 may include a handset or other types of acoustic cabinets, microphones and loudspeakers, a telephone instrument or equivalent, attached audio devices providing voice activation sensing, multiple microphone mixers, acoustic echo cancellation and the like. The data application equipment 102 may comprise computers, non-standardized data application protocols, telematic visual aids such as electronic whiteboards and the like. The system control interface 104 provides control commands and indications between remote counter parts. Terminal-to-modem control conforms to the ITU-T recommendation V.25ter for terminals using external modems connected by a separate physical interface.

Terminal-to-terminal control is performed in a call setup and call control unit 112 according to the ITU-T recommendation H.245.

It is noted that the modem and modem control function is not provided in a H.324/1 compliant ISDN terminal.

Thus, the multimedia information streams supported in the CS terminal equipment 11 comprise video streams, audio streams, data streams and control streams. The video streams are continuous traffic carrying moving color pictures. When used, the bit-rate available for the video streams may vary according to the needs of the audio and data channels. The audio streams are real-time, but may optionally be delayed in the receiver processing path to maintain synchronization with the video streams. In order to reduce the average bit-rate of the audio streams, voice activation may be provided. The data streams may represent still pictures, facsimile, documents, computer files, computer application data, undefined user data, and other data streams.

In the CS terminal equipment 11, a video codec 105 according to ITU-T recommendations H.263 or H.261 is provided which carries out redundancy reduction coding and decoding for the video streams received from the video input/output equipment 101. Furthermore, an audio codec 106 according to ITU-T recommendation G.723.1 is provided, which encodes an audio signal from a microphone of the audio input/output equipment 102 for transmission, and decodes an audio code received from the ISDN 10 to be output to a speaker of the audio input/output equipment 102. An optional receive path delay circuit 109 may be provided for compensating a video delay, so as to maintain audio and video synchronization. An additional data processor 107 may be provided to support data applications such as electronic whiteboards, still image transfer, file exchange, database access, audiographics conferencing, remote device control, network protocols, and the like.

The system control interface 104 provides control signals for controlling a modem 111 according to the ITU-T recommendation V.34 or V.8l.8bis. Furthermore, the system control interface 104 controls the call setup and call control unit 112 which may be arranged to provide and outband setup control function in accordance with the ITU-T recommendation H.225 so as to provide the required outband setup control signaling, and an inband control function in accordance with the ITU-T recommendation H.245. A multiplexer/demultiplexer 110 provides a multiplex protocol function according to the ITU-T recommendation H.223 so as to multiplex transmitted video, audio, data and control streams into a single bit stream, and to demultiplex a received bit stream into various multimedia streams according to the negotiated connection parameters. In addition, the multiplexer/demultiplexer 110 performs logical framing, sequence numbering, error detection and error correction by means of retransmissions, as appropriate to each media component.

The modem 111 converts the synchronous multiplexed bit stream into an analogue signal that can be transmitted over the ISDN 10 and converts the received analogue signal into a synchronous bit stream that is sent to the multiplexer/demultiplexer 110.

The service modification unit 120 which may be a arranged as an input/output unit comprising push buttons or keys and a display for displaying an address or identity of a calling party and e.g. a menu function defining the input parameters which can be input by the push buttons or keys. The service modification unit 120 is connected to a service setting and determination unit 115 which receives input information or instructions from the service modification unit 120 to modify negotiated or default connection parameter settings. The service setting and determination unit 115 is also connected to the system control interface 104 and to the call setup and call control unit 112 so as to enable default settings of the connection parameters and provide a comparing function for comparing the negotiated or default connection characteristics with the connection characteristic of a received answer message from a called terminal. Based on the result of the comparison, the service setting and determination unit 115 instructs the call setup and call control unit 112 to invoke an in-call modification procedure such as a BICC signaling to achieve the required connection service or bearer modifications, i.e. swapping from one service (e.g. video or multimedia) to another service (e.g. speech).

Based on the modified connection parameter input by the service modification unit 120, the service setting and determination unit 115 controls the call setup and call control unit 112 to change or set service definition and/or service/bearer related parameters, such as the BC information element, the LLC information element, or the HLC information element in the answer message which may be an ISUP ANM (ANswer Message) or a corresponding Q.931 answer message. There are several benefits of having the service definition and/or service/bearer related parameters already in the answer message. For instance, it is now possible to start detail record, i.e. charging record generation (CDR), using the correct parameters already at the start of the call. Charging record generation is usually started immediately after the answer message has been received. Therefore, it could otherwise be required to start generating CDR at answer using parameters that are going to be changed very soon. In many systems, intermediate CDRs are generated at every change of service and/or bearer. Therefore, there would be a short duration CDR generated at the start of the call for the parameters that are changed promptly after answering.

Similarly, by having the parameters incorporated in the answer message it is possible to transmit them to the intelligent network service control point at answer detection point.

In the case of the service modification unit 20 arranged at the IP mobile station 2, the modified connection parameter may be a SDP parameter of the SIP, wherein the answer message may be a SIP 200 OK message.

Figure 3:
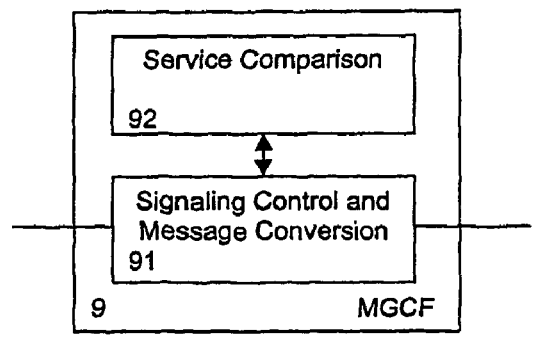
FIG. 3 shows a schematic block diagram of a network device with a multimedia gateway control function according to the preferred embodiment of the present invention.

FIG. 3 shows a schematic block diagram of the MGCF 9 which comprises a signal control and message conversion function 91 and a service comparison function 92. The signaling control and message conversion function 91 is connected to the control channel or control plane used for the outband control signaling to the terminal equipments which are to be connected to each other. The signaling control and message conversion function 91 is arranged to provide a conversion operation between outband signaling messages used in the PS domain and the CS domain. When the signaling control and message conversion function 91 detects an answer message, it supplies the corresponding connection parameter information (e.g. BC, LLC or HLC information element, or session description parameter) to the service comparison function 92 which is arranged to compare the connection parameter information with the connection parameters negotiated for the respective connection in the initial setup negotiation. Based on the result of this comparison operation, i.e. when the connection parameter information of the answer message differs from the connection parameters negotiated during the setup negotiation, the signaling control and message conversion function 91 is controlled to invoke an in-call modification according to the changed connection parameter information.

It is noted that the above described processing may as well be performed at the calling terminal if a corresponding comparison and in-call modification invocation function is provided there. This may not be the case for the IP mobile station 2 shown in FIG. 1.

The service comparison function 92 may be based on a message storing and bit-oriented comparison function with a previously stored information regarding the initial parameter setting according to the setup negotiation.

In the following, signaling scenarios are described with reference to FIGS. 4 and 5, wherein a connection is established between the IP mobile station 2 of the UMTS network and the CS mobile station 16 of the GSM core network.

The IP mobile station 2 performs a setup signaling according to the Session Initiation Protocol (SIP) used for initiating calls in IP networks, such as the Internet. SIP can be used to establish multimedia sessions or calls such as Internet telephony, multimedia conferencing and distance learning. SIP supports user mobility, that is the ability of end-users to make and receive calls and access subscribed telecommunication services from any location and the ability of the network to track the location of the user. The first step in the initiation of a call using SIP is to locate a SIP server for the callee. In the present case, the SIP server may be located at the MGCF 9. Once the SIP server has been found, the client can invite the callee to join a communication session by transmitting an INVITE message. A successful indication consists of an INVITE message followed by an ACK message.

The INVITE message contains a session description that provides the called party with enough information to join the session. Furthermore, it contains a connection parameter information defining media components and formats the caller is willing to receive and a location where it wishes the callee to send any data. If the callee decides to accept the call, it responds with a session description of its own, listing the desired connection parameters of the callee or called party. The session description is based on the Session Description Protocol (SDP) which indicates the media components, the transport protocol, the media format, and IP addresses and ports.

Figure 4:
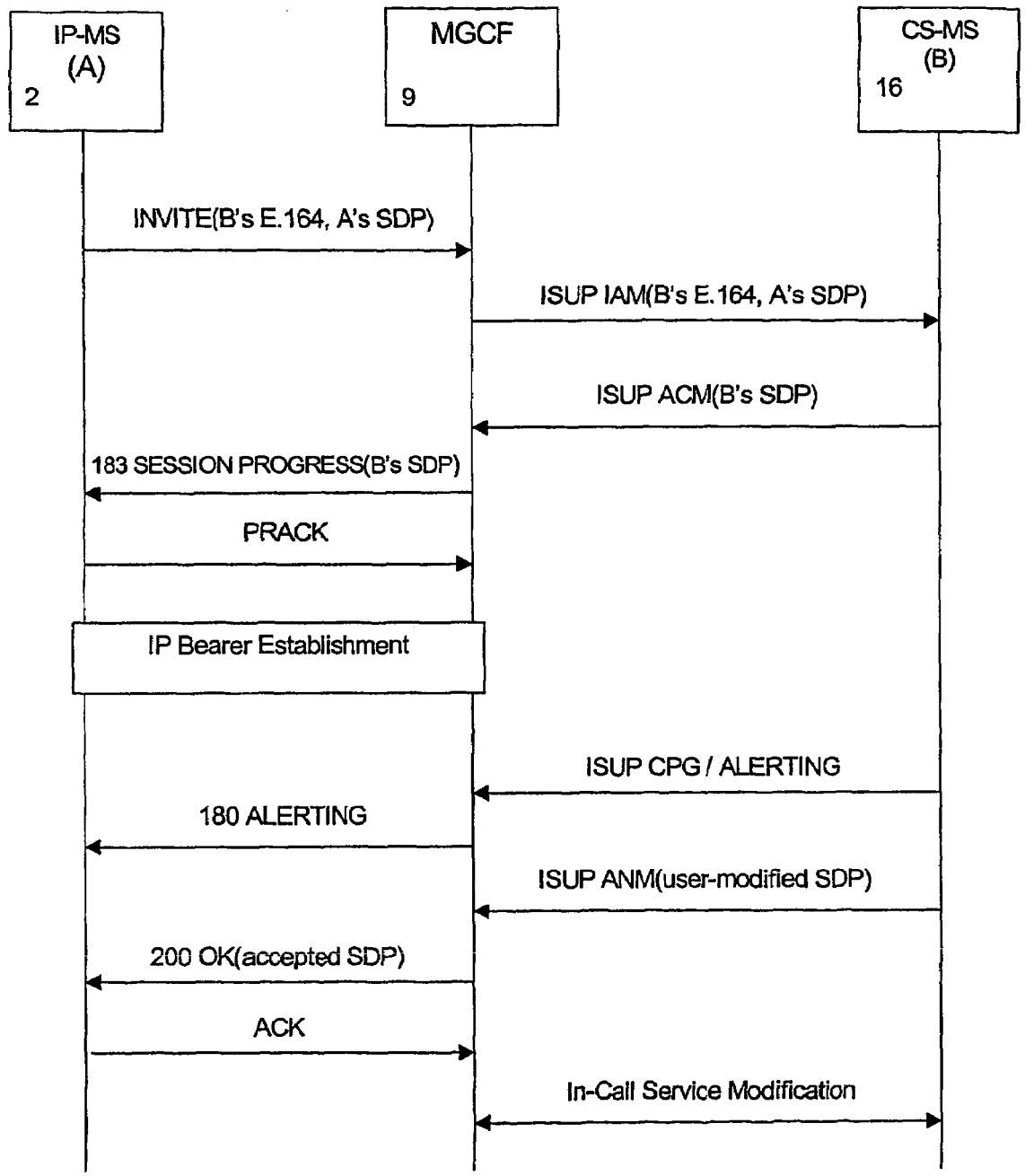
FIG. 4 shows a message signaling diagram for a CS terminated multimedia call.

FIG. 4 shows a message signaling diagram for a CS terminated multimedia call initiated by the IP mobile station 2 supporting connection parameters A. The MGCF 9 receives a setup message (SIP message INVITE) from the IP mobile station 2, which contains a session description (A's SDP) of the requested connection parameters and an address information E.164 for routing the message. At the CSCF 7, a number analysis is performed with respect to the address information E.164 and the name or address of the MGCF 9 is derived. Then, the INVITE message is routed to the MGCF 9 which initiates a corresponding reservation of IP and SCN terminations at the MGW 4. Furthermore, the MGCF 9 converts the received INVITE message into an ISUP IAM message containing address information E.164 and the requested session description parameters. The CS mobile station 16 receives the mobile network setup message (the ISUP IAM message) and responds with a call confirmed message (an ISUP ACM (Address Complete Message)) containing preset or desired session description parameters, which is then transmitted to the MGCF 9. At the MGCF 9, the ISUP ACM is converted into an SIP 183 SESSION PROGRESS message containing the SDP connection parameters of the CS mobile station 16. Then, an acknowledgement message PRACK is transmitted from the IP mobile station 2 to the MGCF 9. Having received this acknowledgement, the signaling control and message conversion function 91 of the MGCF 9 establishes an IP bearer connection according to the negotiated connection parameters. Then, the CS mobile station 16 issues an ISUP CPG (Call ProGress) or Alerting message to the MGCF 9 which converts the message into an SIP 180 ALERTING message.

Since the user of the CS mobile station 16 has been informed in the meantime of the identity of the calling party, it may perform a corresponding input operation at the service modification unit 160, and the service setting and determination unit 115 controls the call setup and call control unit 112 at the CS mobile station 16 to modify the session description parameters in the ISUP ANM which is then transmitted to the MGCF 9. The service comparison function 92 of the MGCF 9 recognizes the difference in the connection parameters and controls the signaling control and message conversion function 91 to transmit a SIP 200 OK message including the new SDP parameters as accepted parameters to the IP mobile station 2. After having received an SIP ACK acknowledgement message, the signaling control and message conversion function 91 of the MGCF 9 invokes an in-call service modification based on the modified SDP parameters.

Optionally, the in-call modification can be invoked immediately after the receipt of the answer message.

Thus, the network recognizes the difference between the service/parameters of the setup negotiation and the service/parameters in the respective answer message. The network interprets this as a desired invocation of the in-call modification and starts a modification procedure to adapt the bearer/traffic channel to the service/parameters in the answer message. Thereby, the connection part in the fixed network (fixed network leg) and the calling party are adapted to the new conditions. If the calling party and network are using a CS bearer, the service/parameter information in the answer message are transmitted to the calling party in a Q.931 CONNECT message, or a bearer modification signaling is invoked by the MGCF 9 to invoke a modification in the fixed network leg. If neither way is possible in the underlying network, the calling party will have to deduce a possible fallback inband, e.g. in case of a video call the standard procedure to fallback to speech is initiated. After the modifications, the application layer connection is established.

However, if the network does not support service modification functionality, the network ignores the service/parameter information in the answer message and sets up the call as agreed in the initial setup negotiation.

Figure 5:
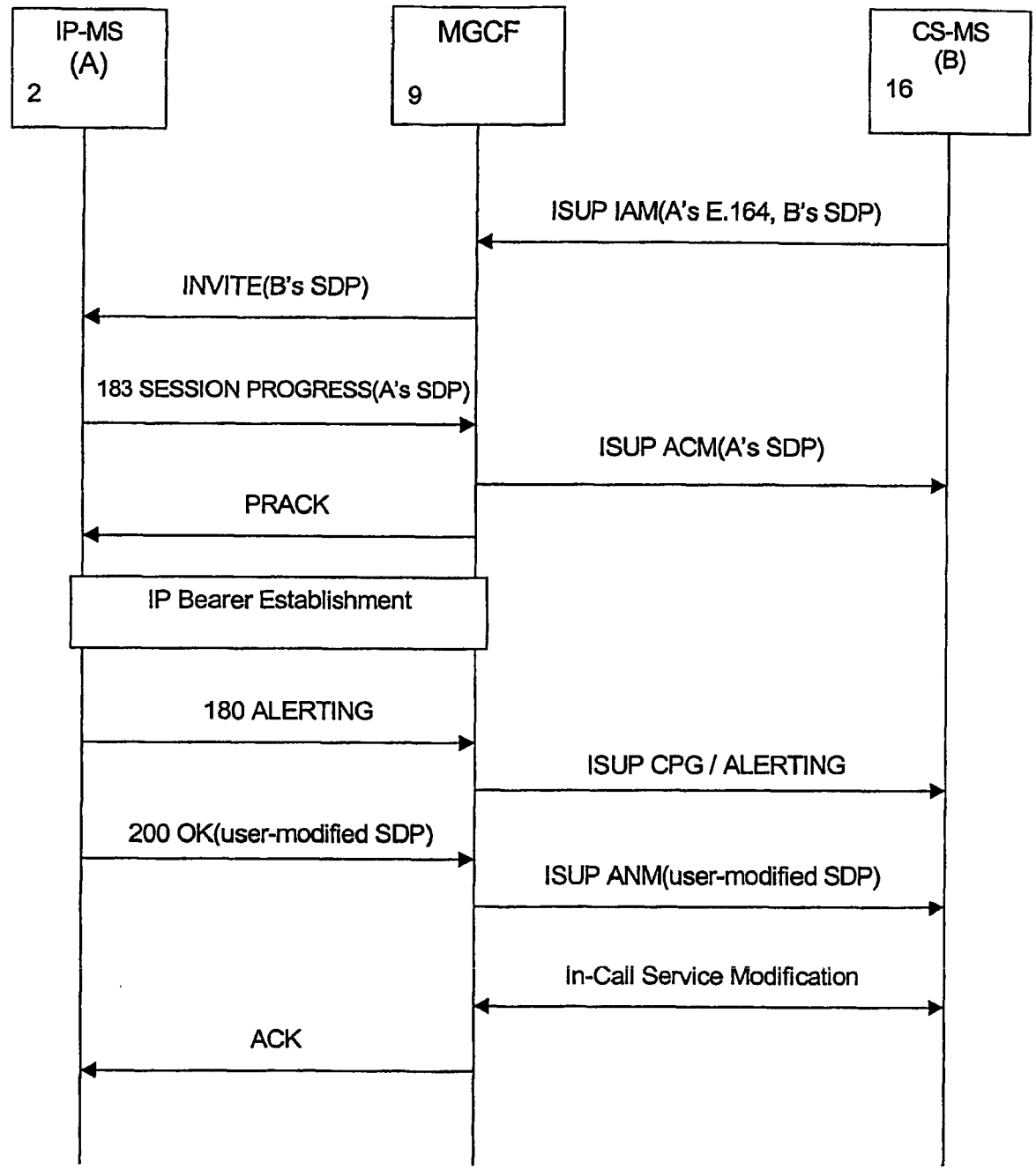
FIG. 5 shows a message signaling diagram for a CS originated multimedia call.

FIG. 5 shows a message signaling diagram for a CS originated multimedia call. Initially, an ISUP IAM message containing an address information E.164 of the IP mobile station 2 and session description parameters (B's SDP) of the calling CS mobile station 16 is routed via the GMSC 13 and the T-SGW 12 to the MGCF 9, where a number analysis is performed on the basis of the address information E.164 so as to obtain the respective domain name of a Domain Name Server, and to obtain the required IP address to route the message via the SGSN 5 to the called IP mobile station 2. The ISUP IAM message is converted by the MCGF 9 into a SIP INVITE message comprising the SDP parameters of the calling CS mobile station 16. The IP mobile station 2 responds with a SIP 183 SESSION PROGRESS message containing the session description parameters of the IP mobile station 2. The MGCF 9 converts this message into a ISUP ACM message containing the session description parameters of the IP mobile station 2. Additionally, the MGCF 9 transmits an acknowledgement message PRACK to the IP mobile station 2, and a corresponding IP bearer is established. Then, the IP mobile station 2 transmits a SIP 180 ALERTING message to the MGCF 9 which is converted into a ISUP CPG or ALERTING message and transmitted to the CS mobile station 16. If the called user at the IP mobile station 2 has modified the parameter settings by the service modification unit 20, correspondingly modified SDP parameters are incorporated into the SIP answer message 200 OK and transmitted to the MGCF 9. There, the SIP 200 OK message is converted into an ISUP ANM answer message comprising the user-modified session description parameters and transmitted to the CS mobile station 16.

The service setting and determination unit 115 of the terminal equipment of the CS mobile station 16 recognizes the changed session description parameters based on the performed comparison operation and controls the call setup and call control unit 112 to invoke a corresponding in-call service modification according to the changed connection parameters. When the service modification is achieved, the MCGF 9 transmits a SIP ACK message to the IP mobile station 2. Then, the connection is established.

Thus, in a mobile circuit-switched originated call, the called party (fixed or mobile, circuit-switched or packet-switched) transmits a service definition and/or service/bearer related parameters in the answer message. When the calling circuit-switched mobile party compares the information received in the answer message to the service/parameters agreed on in the initial setup negotiation, it recognizes a significant change, e.g. a speech service is indicated in the answer message whereas a video/multimedia service was agreed in the initial setup negotiation. Then, the calling mobile party invokes an in-call modification to adapt the originated leg of the traffic channel to the terminated leg, and swaps or adapts the bearer to the new service/parameters on the application level. Alternatively, the network, e.g. the MGCF 9 or any other switching or routing network element, may recognize the service/parameter difference and, consequently, invoke the in-call modification.

It is noted that the above message signaling diagrams also apply to the case of an ISDN terminated and originated call, respectively, wherein the CS terminal equipment 11 is the called party or the calling party, respectively. However, in the case of the ISDN terminated call, there will be no in-call modification in the called network leg, and in the case of the ISDN originated call, there will be no in-call modification in the calling network leg.

It is noted that the present invention is not restricted to the preferred embodiment described above, but can be implemented in any fixed or wireless network environment, where an initial outband signaling is provided for setting up a connection. Any suitable connection parameter can be incorporated into any suitable answer message so as to eliminate the need for an extra in-call modification phase initiated by the establishment of the service or bearer. The preferred embodiment may thus vary within the scope of the attached claims.

The invention claimed is:

1. A method, comprising:
   establishing a connection via a circuit switched network;
   providing, by a terminal device, an input function to enable a change of at least one connection parameter after a setup signaling message has been received from a calling terminal, said at least one connection parameter defining at least one type of information stream supported by a terminal device;
   incorporating said at least one connection parameter into an answer signaling message transmitted to said calling terminal in response to said setup signaling message;
   comparing said at least one modified connection parameter with at least one negotiated connection parameter, to produce a comparison result; and
   initiating a modification of said at least one connection parameter based on the comparison result of the comparing of said at least one modified connection parameter with at least one negotiated connection parameter.

2. A method according to claim 1, wherein said modification comprises invoking an in-call modification.

3. A method according to claim 1, wherein said terminal device is a multimedia terminal.

4. A method according to claim 3, wherein said multimedia terminal is a H.324 compliant terminal.

5. A method according to claim 1, wherein said connection parameter defines a multimedia bearer service.

6. A method according to claim 5, wherein said multimedia bearer service corresponds to a video service, a multimedia service, or a speech service.

7. A method according to claim 2, wherein said in-call modification is invoked by a bearer independent call control signaling.

8. A method according to claim 1, wherein said answer signaling message is an integrated services digital network user part answer signaling message or a Q.931 CONNECT message.

9. A method according to claim 8, wherein said connection parameter comprises a bearer capability, low layer compatibility and/or high layer compatibility information element.

10. A method according to claim 1, wherein said answer signaling message is an session initiation protocol 200 OK message, and said connection parameter is a service description protocol parameter of said session initiation protocol 200 OK message.

11. A method according to claim 1, wherein said setup signaling message is an integrated services digital network user part initial address signaling message or an session initiation protocol INVITE message.

12. A method according to claim 2, wherein said comparing and invoking are performed in said calling terminal or in a network element through which said answer signaling message is routed.

13. A method according to claim 12, wherein said network element comprises a media gateway control function.

14. An apparatus, comprising:
   a processor configured to establish a connection via a circuit switched network;
   an input unit configured to enable a change of a connection parameter after a setup signaling message has been received from a calling terminal, said connection parameter defining a type of information stream supported by said apparatus having a service modification function for modifying a connection parameter;
   a setting unit configured to incorporate said connection parameter into an answer signaling message;
   a transmitter configured to transmit said answer signaling message to said calling terminal in response to said setup signaling message;
   a comparator configured to compare said connection parameter with at least one negotiated connection parameter, to produce a comparison result; and
   an initiator configured to initiate a modification of said at least one connection parameter based on the comparison result of the comparing of said at least one modified connection parameter with at least one negotiated connection parameter.

15. An apparatus according to claim 14, wherein said setup signaling message is an integrated services digital network user part initial answer signaling message or a session initiation protocol INVITE message, and said answer signaling message is an integrated services digital network user part answer signaling message or an session initiation protocol 200 OK message.

16. An apparatus according to claim 15, wherein said connection parameter is an service description protocol parameter incorporated in said session initiation protocol 200 OK message, or a bearer capability, low layer compatibility and/or high layer compatibility parameter incorporated in said integrated service digital network answer signaling message.

17. An apparatus, comprising:
   a processor configured to establish a connection via a circuit switched network;
   a transmitter configured to transmit a setup signaling message to a called terminal;
   a receiver configured to receive an answer signaling message to said setup signaling message from said called terminal;

a detector configured to detect a connection parameter incorporated in said answer signaling message transmitted to said terminal;

a comparator configured to compare said detected connection parameter with a negotiated connection parameter which has been negotiated in a setup negotiation, to produce a comparison result; and a call controller configured to initiate a modification of said connection parameter based on the comparison result of the comparator.

18. An apparatus according to claim 17, wherein said call control unit is arranged to invoke an in-call modification.

19. An apparatus according to claim 17, wherein said setup signaling message is an integrated service digital network user part initial answer signaling message or an session initiation protocal INVITE message, and said answer signaling message is an integrated service digital network answer signaling message or an session initiation protocol 200 OK message.

20. An apparatus according to claim 19, wherein said connection parameter is a service description protocol parameter incorporated in said session initiation protocol 200 OK message, or a bearer capability, low layer compatibility and/or high level compatibility parameter incorporated in said integrated service digital network answer signaling message.

21. An apparatus according to claim 17, wherein said apparatus is a H.324 compliant terminal device.

22. An apparatus according to claim 18, wherein said call controller is compliant with the H.245 control protocol, and said in-call modification is invoked by a bearer independent call control signaling.

23. An apparatus according to claim 18, wherein a preferred composition of information processor unit can be configured by the user of the terminal.

24. An apparatus according to claim 23, wherein the user is provided with graphical symbols representing the choices concerning the media types for answering the call.

25. An apparatus comprising:

a processor configured to establish a connection via a circuit switched network;

a detector configured to detect a connection parameter incorporated in an answer signaling message transmitted to said terminal device in response to a setup signaling message transmitted to the terminal device from the apparatus;

a comparator configured to compare said detected connection parameter with a negotiated connection parameter which has been negotiated in a setup negotiation, to produce a comparison result; and a signaler configured to initiate a modification of said connection parameter based on the comparison result of the comparing unit.

26. An apparatus according to claim 25, wherein said signaler is arranged to invoke an in-call modification.

27. An apparatus according to claim 25, wherein said network element comprises a media gateway control function, and said answer signaling message is an integrated service digital network user part answer signaling message or a session initiation protocol 200 OK message.

28. An apparatus according to claim 27, wherein said connection parameter is a service description protocol parameter incorporated in said session initiation protocol 200 OK message, or a bearer capability, a low layer compatibility and/or a high level compatibility parameter incorporated in said integrated service digital network user part answer signaling message.

29. An apparatus according to claim 26, wherein said in-call modification is invoked by a bearer independent call control signaling.

30. A method, comprising:

establishing a connection via a circuit switched network;

transmitting, by a terminal device, a setup signaling message to a called terminal;

receiving an answer signaling message to said setup signaling message from said called terminal;

detecting a connection parameter incorporated in said answer signaling message transmitted to said terminal;

comparing said detected connection parameter with a negotiated connection parameter which has been negotiated in a setup negotiation, to produce a comparison result; and initiating a modification of said connection parameter based on the comparison result of the comparing.

31. An apparatus, comprising:

connection establishing means for establishing a connection via a circuit switched network;

transmitting means for transmitting a setup signaling message to a called terminal;

receiving means for receiving an answer signaling message to said setup signaling message from said called terminal;

detecting means for detecting a connection parameter incorporated in said answer signaling message transmitted to said terminal;

comparing means for comparing said detected connection parameter with a negotiated connection parameter which has been negotiated in a setup negotiation, to produce a comparison result; and call control means for initiating a modification of said connection parameter based on the comparison result of the comparing means.

32. An apparatus comprising:

connection establishing means for establishing a connection via a circuit switched network;

detecting means for detecting a connection parameter incorporated in an answer signaling message transmitted to a terminal device in response to a setup signaling message;

comparing means for comparing said detected connection parameter with a negotiated connection parameter which has been negotiated in a setup negotiation, to produce a comparison result; and signaling means for initiating a modification of said connection parameter based on the comparison result of the comparing means.

33. A method according to claim 30, further comprising:
invoking an in-call modification.

34. A method according to claim 33, further comprising:
configuring a preferred composition of information processor.

* * * * *